US012800040B2

(12) United States Patent
Iwao et al.

(10) Patent No.: US 12,800,040 B2
(45) **Date of Patent: *Nov. 17, 2026**

(54) FAUCET DEVICE

(71) Applicant: TOTO LTD., Kitakyushu (JP)

(72) Inventors: Enisei Iwao, Fukuoka (JP); Rei Tsubone, Fukuoka (JP); Masanobu Kanashiro, Fukuoka (JP); Junsei Idegomori, Fukuoka (JP); Makoto Hatakeyama, Fukuoka (JP)

(73) Assignee: TOTO LTD., Kitakyushu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/059,672

(22) Filed: Feb. 21, 2025

(65) Prior Publication Data

US 2025/0284301 A1 Sep. 11, 2025

(30) Foreign Application Priority Data

Mar. 8, 2024 (JP) ................................ 2024-036269

(51) Int. Cl.

| | |
|---|---|
| ***F16K 11/10*** | (2006.01) |
| ***E03C 1/02*** | (2006.01) |
| ***E03C 1/04*** | (2006.01) |
| ***E03C 1/05*** | (2006.01) |
| ***F16K 11/00*** | (2006.01) |

(52) U.S. Cl.

CPC .............. *F16K 11/10* (2013.01); *E03C 1/023* (2013.01); *E03C 1/04* (2013.01); *E03C 1/0408* (2013.01); *E03C 1/055* (2013.01); *F16K 19/006* (2013.01)

(58) Field of Classification Search

CPC ............................... F16K 19/006; F16K 11/10

See application file for complete search history.

(56) References Cited

U.S. PATENT DOCUMENTS 4,756,030 A * 7/1988 Juliver .................... E03C 1/055 4/677

5,577,660 A * 11/1996 Hansen ............. G05D 23/1393 4/677

(Continued)

FOREIGN PATENT DOCUMENTS

| | | |
|---|---|---|
| JP | 2010-276046 | 12/2010 |
| JP | 2011-021328 | 2/2011 |

*Primary Examiner* — Umashankar Venkatesan

(74) *Attorney, Agent, or Firm* — Amin, Turocy & Watson, LLP

(57) ABSTRACT

A faucet device according to an embodiment includes a water spout part, a hot water and cold water mixing unit, an actuator, a controller, and an operation unit. The hot water and cold water mixing unit includes a body casing, a thermo-sensitive energizing part, and a valve body. The controller is configured to: execute a water spouting mode and a calibration mode, the water spouting mode being a mode for driving, in receiving the information on the set temperature, the actuator to a predetermined position or by a predetermined drive amount that are corresponding to the set temperature to adjust a position of the valve body in an axial direction of the valve body; and the calibration mode is a mode for adjusting setting of the predetermined position or the predetermined drive amount in accordance with at least one of an arrangement environment and product unevenness.

12 Claims, 11 Drawing Sheets

(56) References Cited

U.S. PATENT DOCUMENTS

| | | | | | |
|---|---|---|---|---|---|
| 5,623,990 | A * | 4/1997 | Pirkle | G05D 23/1386 | 165/294 |
| 7,458,520 | B2 * | 12/2008 | Belz | G05D 23/1393 | 236/12.12 |
| 10,191,500 | B2 * | 1/2019 | Akita | F24D 17/00 | |
| 11,566,405 | B2 * | 1/2023 | Reeder | E03D 9/04 | |
| 2003/0088338 | A1 * | 5/2003 | Phillips | F16K 11/207 | 700/282 |
| 2006/0231636 | A1 * | 10/2006 | Schmitt | F16K 19/006 | 236/12.11 |
| 2007/0012792 | A1 * | 1/2007 | Iwai | G05D 23/1353 | 236/12.11 |
| 2012/0055557 | A1 * | 3/2012 | Belz | F16K 31/0644 | 137/1 |
| 2013/0291978 | A1 * | 11/2013 | Baker | E03C 1/04 | 137/801 |
| 2022/0002985 | A1 * | 1/2022 | Sansum | E03B 1/041 | |
| 2023/0183953 | A1 * | 6/2023 | Torres | E03C 1/04 | 4/676 |

* cited by examiner

FAUCET DEVICE

CROSS-REFERENCE TO RELATED APPLICATION(S)

This application is based upon and claims the benefit of priority of the prior Japanese Patent Application No. 2024-036269, filed on Mar. 8, 2024, the entire contents of which are incorporated herein by reference.

FIELD

Embodiment of the disclosure relates to a faucet device.

BACKGROUND

Conventionally, in a faucet device including an electronic temperature controlling valve that causes an actuator to drive a Shape Memory Alloy (SMA) thermo-valve, there has been known that feedback control is executed on the actuator in order to adjust a spouted water temperature in spouting water (see Japanese Laid-Open Patent Publication No. 2011-021328).

In the above-mentioned faucet device, there has been a problem that in a case where temperature control by feedback control of the actuator and temperature adjustment by the SMA are executed in an overlapped manner, it takes a long time interval until a spouted water temperature stabilizes. Moreover, there has been a problem that in a case without the feedback control; a hot water temperature, a hot water pressure, a cold water temperature, and a cold water pressure from a hot water supplying path and a cold water supplying path are different for each scene, and thus temperature adjustment is not completely executed by spontaneous operations of the SMA thermo-valve depending on conditions thereof, thereby leading to difference in a spouted water temperature in some cases.

SUMMARY

A faucet device according to one aspect of an embodiment includes: a water spout part that spouts water towards an interior of a bathroom; a hot water and cold water mixing unit that mixes hot water and cold water to be supplied to the water spout part; an actuator that causes the hot water and cold water mixing unit to operate; a controller configured to control driving of the actuator; and an operation unit configured to transmit information on a set temperature to the controller based on an operation of a user, wherein the hot water and cold water mixing unit includes: a body casing in which a hot water inlet, a cold water inlet, and a mixed hot water and cold water outlet are formed; a thermo-sensitive energizing part that changes in accordance with a temperature of mixed hot water to be capable of adjusting open degrees of the hot water inlet and the cold water inlet; and a valve body that is incorporated into the body casing to be able to slide along an axial direction of the body casing to adjust the open degrees of the hot water inlet and the cold water inlet, and the controller is further configured to: execute a water spouting mode and a calibration mode, the water spouting mode being a mode for driving, in receiving the information on the set temperature, the actuator to a predetermined position or by a predetermined drive amount that are corresponding to the set temperature to adjust a position of the valve body in an axial direction of the valve body; and the calibration mode is a mode for adjusting setting of the predetermined position or the predetermined drive amount in accordance with at least one of an arrangement environment and product unevenness.

The faucet device is capable of adjusting, in accordance with each of scenes, a hot water temperature, a hot water pressure, a cold water temperature, and a cold water pressure from the hot water supplying path and the water supplying path which are different for each scene, and individual difference in temperature adjustment of an SMA thermo-valve. Thus, the faucet device causes the actuator to move the SMA thermo-valve only when changing a set temperature, and further executes temperature adjustment by using the SMA thermo-valve during spouting of water, so that it is possible to execute temperature adjustment having high accuracy according to the set temperature. The faucet device is capable of achieving, as much as possible, features to be capable of shortening a time interval until a temperature becomes stable in a case where temperature change and/or pressure fluctuation occurs in supplied cold water or supplied hot water during spouting of water.

The faucet device further includes: a temperature sensor arranged on upstream or downstream of the hot water and cold water mixing unit, wherein in the calibration mode, setting of the predetermined position or the predetermined drive amount is adjusted based on information from the temperature sensor.

In the faucet device, in entering the calibration mode, a predetermined position or a predetermined drive amount is automatically adjusted. Thus, the faucet device is capable of improving usability of a user.

In the calibration mode, the controller is further configured to: cause the actuator to operate while spouting water from the water spout part.

The faucet device drives the actuator while recognizing environment in actually spouting water, so that it is possible to improve the accuracy in the calibration.

The calibration mode can be executed by an operation with respect to the operation unit.

Calibration can be executed by a remote controller that is used in common water spouting operations. Thus, the faucet device does not need a dedicated setting remote controller.

The controller is further configured to: in the calibration mode; search equal to or more than three temperature changing points; and adjust the predetermined position or the predetermined drive amount based on the specified temperature changing points.

The faucet device uses equal to or more than three temperature changing points so as to improve the accuracy in calibration.

The controller is further configured to: in the calibration mode; acquire a first temperature that is a temperature at a temperature changing point where searching and specifying a temperature lower than a predetermined temperature as a target temperature; a second temperature that is a temperature at a temperature changing point where searching and specifying the predetermined temperature as a target temperature; and a third temperature that is a temperature at a temperature changing point where searching and specifying a temperature higher than the predetermined temperature as a target temperature; and adjust setting of the predetermined position or the predetermined drive amount based on the second and the first temperatures, and the second and the third temperatures.

It is true that there presents a case where characteristics of the thermo-sensitive energizing part change between under and over the predetermined temperature, the faucet device adjusts setting of a position or a drive amount that are predetermined on the basis of a temperature within a range lower than the predetermined temperature and a temperature within a range higher than the predetermined temperature, so that it is possible to prevent a set temperature from shifting in executing temperature adjustment crossing the predetermined temperature.

The controller is further configured to: in the calibration mode; search two temperature changing points; and adjust setting of the predetermined position or the predetermined drive amount based on the specified temperature changing points.

The faucet device is capable of executing calibration without taking time, while keeping the accuracy in calibration near the predetermined temperature.

The controller is further configured to: in the calibration mode; search a single temperature changing point; and adjust setting of the predetermined position or the predetermined drive amount based on the specified temperature changing point.

The faucet device is capable of shortening a time interval until completion of calibration.

The actuator includes a motor, and in the calibration mode; a temperature sensor arranged on downstream of the hot water and cold water mixing unit detects a spouted water temperature, and the controller is further configured to: adjust setting of the predetermined position or the predetermined drive amount based on a drive amount of the motor and the spouted water temperature in a case where the motor takes the drive amount.

The faucet device executes simple operational processing on the basis of a drive amount of the motor and a spouted water temperature, so that it is possible to simplify software processing.

In the calibration mode; a temperature sensor arranged on upstream of the hot water and cold water mixing unit detects a hot water supplying temperature, and the controller is further configured to: determine whether or not the hot water supplying temperature is equal to or less than a predetermined temperature.

The faucet device is capable of recognizing whether or not a hot water supplying temperature is an appropriate temperature, and further is capable of informing a user of whether or not the hot water supplying temperature is an appropriate temperature in accordance with a situation.

The controller is further configured to: in the calibration mode; in a case where the hot water supplying temperature is equal to or less than the predetermined temperature, execute the water spouting mode by using a table that stores therein the set temperature, and the predetermined position or the predetermined drive amount in association with each other.

In a case where a hot water supplying temperature is equal to or lower than an appropriate temperature, the faucet device is capable of reducing a case where lukewarm hot water is spouted. Thus, the faucet device is capable of avoiding reduction in usability of a user.

The actuator includes a motor, and the controller is further configured to: during the calibration mode, not release excitation of the motor.

In a case where the excitation is released after driving the motor by a small step, there presents possibility that spring back occurs, which causes the motor to return to the last position due to load that is applied to the motor; however, it is possible to remove effects due to the above-mentioned spring back, and further to execute precise temperature controlling during execution of calibration. Thus, the faucet device is capable of improving the accuracy in calibration.

In the calibration mode; a temperature sensor that is arranged on upstream of the hot water and cold water mixing unit detects a hot water supplying temperature, and the controller is further configured to: start to adjust setting of the predetermined position or the predetermined drive amount after the hot water supplying temperature becomes stable.

The faucet device is capable of precisely executing temperature controlling in calibration while reducing effects due to heat absorption of cold cast metal, and starting up of the hot water supplying device. Thus, the faucet device is capable of improving the accuracy in calibration.

BRIEF DESCRIPTION OF DRAWING(S)

DESCRIPTION OF EMBODIMENT(S)

Figure 1:
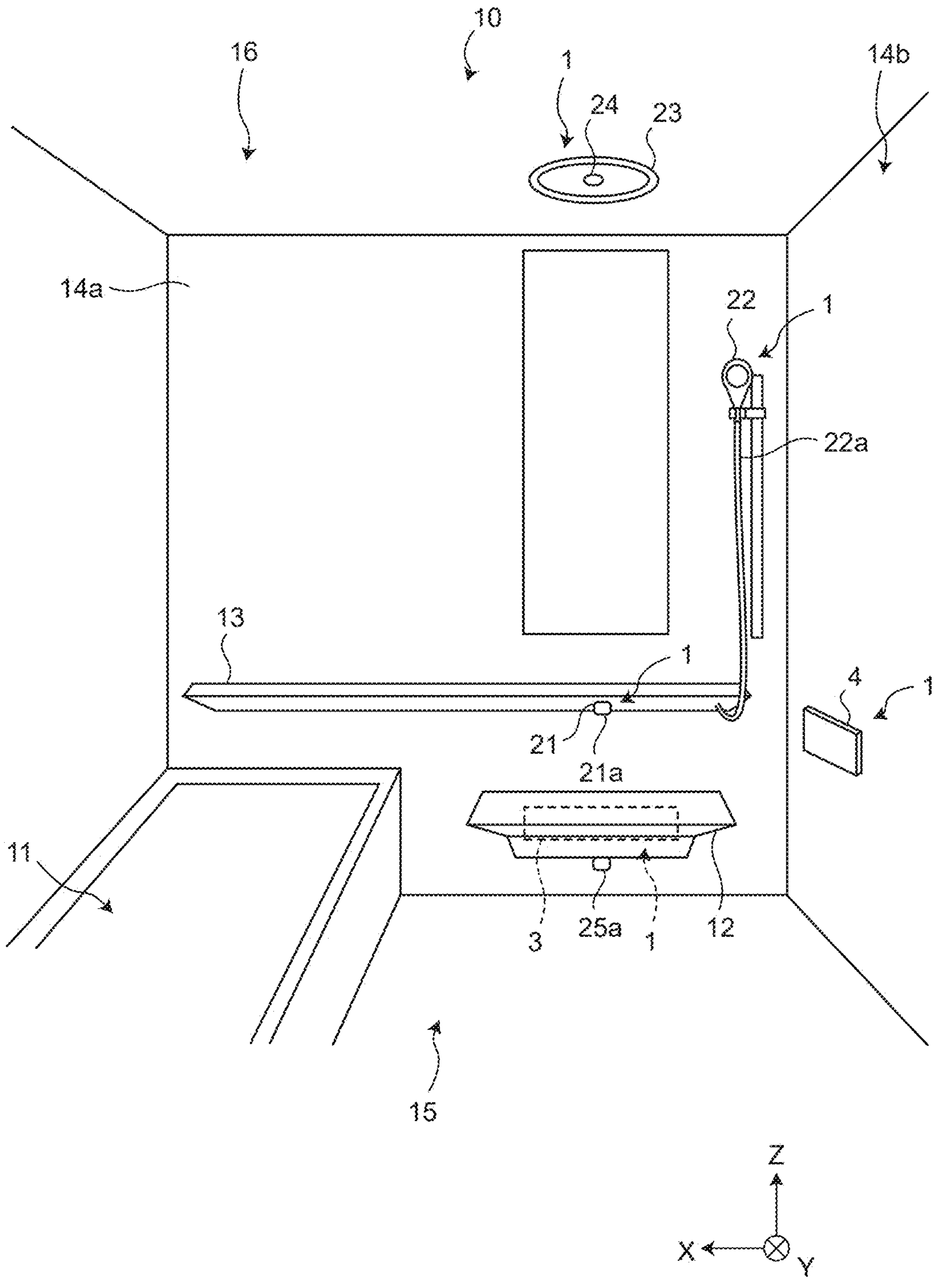
FIG. 1 is a schematic diagram illustrating one example a bath unit in which a faucet device is arranged according to an embodiment.

As illustrated in FIG. 1, a faucet device 1 according to an embodiment is arranged in a bath unit 10, for example. FIG. 1 is a schematic diagram illustrating one example the bath unit 10 in which the faucet device 1 is arranged according to the embodiment.

An illustrated orthogonal coordinate system prescribes the positive direction of an X-axis as “left direction”, and further prescribes the negative direction of the X-axis as “right direction”. The orthogonal coordinate system prescribes the positive direction of a Y-direction as “back direction”, and further prescribes the negative direction of the Y-direction as “front direction”. The orthogonal coordinate system prescribes the positive direction of a Z-axis as “upward”, and further prescribe the negative direction of the Z-axis as “downward”. Therefore, in the following explanation, an X-axis direction may be referred to as a left-right direction, a Y-axis direction may be referred to as a front-back direction, and a Z-axis direction may be referred to as an up-and-down direction.

The bath unit 10 includes a bathtub 11, a first counter 12, a second counter 13, and the faucet device 1. Note that in the following, in a case where not differentiating cold water spouted from the faucet device 1, and mixed hot water obtained by mixing hot water and cold water with each other to be spouted from the faucet device 1, they are comprehensively referred to as "warm/cold water".

The first counter 12 is attached to a wall part 14*a* of the bath unit 10. The first counter 12 protrudes towards the interior of a bathroom from the wall part 14*a*. The first counter 12 is arranged above a washing place floor 15 of the bath unit 10. The first counter 12 houses therein a faucet body 3 of the faucet device 1. A hot water waiting water spout port 25*a* is arranged at a lower end of the first counter 12. The hot water waiting water spout port 25*a* is arranged in the first counter 12 such that a water spouting direction of warm/cold water is downward.

The second counter 13 is attached to the wall part 14*a*. The second counter 13 protrudes towards the interior of the bathroom from the wall part 14*a*. The second counter 13 is arranged above the first counter 12. For example, the second counter 13 extends over the bathtub 11. Note that it is sufficient that the second counter 13 does not extend over the bathtub 11.

The second counter 13 houses therein a part of the faucet device 1. Specifically, the second counter 13 houses therein a part of a faucet 21 in the faucet device 1, and a part of a hand shower 22 in the faucet device 1. A water spout port 21*a* of the faucet 21 is arranged in the second counter 13 to be exposed therefrom. The water spout port 21*a* of the faucet 21 is arranged in the second counter 13 such that a water spouting direction of warm/cold water is downward.

A shower hose 22*a* of the hand shower 22 in the faucet device 1 is connected with the second counter 13. The shower hose 22*a* is connected to a shower water guiding channel housed in the second counter 13.

To a ceiling 16 of the bath unit 10, an overhead shower 23 of the faucet device 1 and a warm pillar 24 of the faucet device 1 are attached. The overhead shower 23 and the warm pillar 24 are integrally configured.

The overhead shower 23 spouts warm/cold water towards a broad range of a user that is broader than a case of the hand shower 22. For example, the overhead shower 23 configured such that warm/cold water falls on the whole body of a user. The warm pillar 24 collects and arranges warm/cold water into a single water flow so as to spout it therefrom. In other words, the warm pillar 24 arranges and spouts warm/cold water such that consecutive warm/cold water falls down in a columnar manner.

A remote controller 4 (namely, operation unit) of the faucet device 1 is attached to a wall part 14*b* of the bath unit 10. The remote controller 4 may be attached to the wall part 14*a* to which the first counter 12 and the second counter 13 are attached.

The remote controller 4 receives various operations of a user with respect to the faucet body 3. Specifically, the remote controller 4 receives a setting operation of a temperature (namely, set temperature) of warm/cold water in the faucet body 3. The remote controller 4 receives a setting operation of a flow volume of warm/cold water in the faucet body 3. The remote controller 4 receives a switching operation between spouting and stopping of warm/cold water. The remote controller 4 receives a switching operation of a water spouting part of warm/cold water. In a case where being operated by a user, the remote controller 4 transmits an operation signal according to a corresponding operation to a controller 7 (see FIG. 3) of the faucet device 1.

Figure 2:
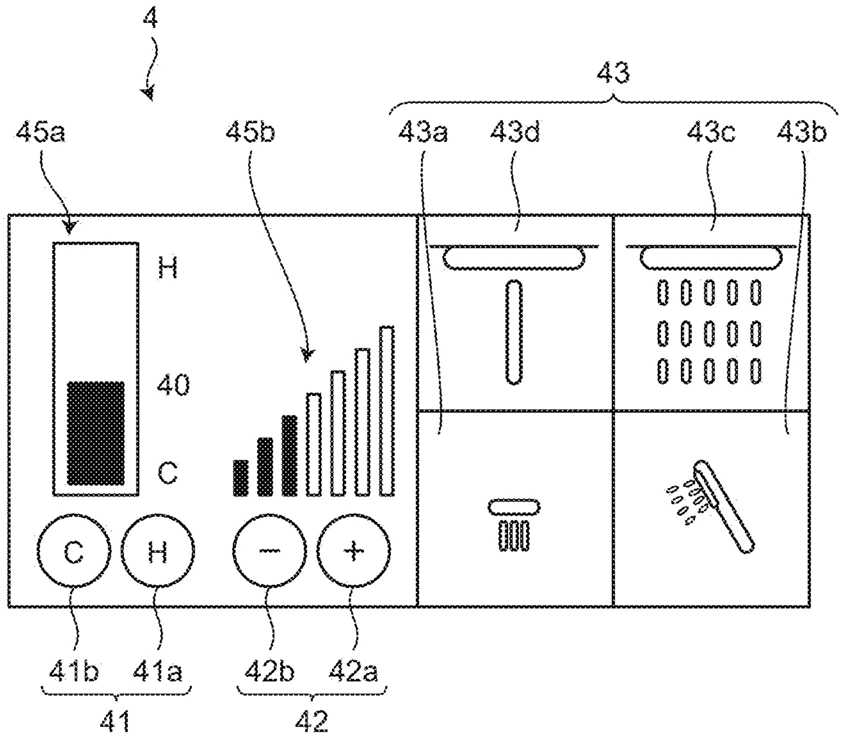
FIG. 2 is a front view illustrating a remote controller according to the embodiment.

For example, as illustrated in FIG. 2, the remote controller 4 includes a temperature adjusting button 41, a water amount adjusting button 42, and a switching button 43. FIG. 2 is a front view illustrating the remote controller 4 according to the embodiment.

The temperature adjusting button 41 is a button for adjusting a temperature of mixed hot water in the faucet body 3. The temperature adjusting button 41 includes a high temperature button 41*a* and a low temperature button 41*b*. The high temperature button 41*a* is a button for increasing a temperature of mixed hot water. The low temperature button 41*b* is a button for reducing a temperature of mixed hot water. Note that the remote controller 4 causes a first display 45*a* to display a setting state of a temperature of mixed hot water. In a case where the high temperature button 41*a* or the low temperature button 41*b* is operated, displaying of the first display 45*a* is changed in accordance with an operation with respect to the buttons 41*a* and 41*b*.

Note that a temperature of mixed hot water in the faucet body 3 can be adjusted within a predetermined temperature range. In a case where a set temperature of mixed hot water becomes lower than the lowest temperature of the predetermined temperature range by an operation with respect to the low temperature button 41*b*, hot water is not mixed with cold water in the faucet body 3 so as to spout the cold water.

The water amount adjusting button 42 is a button for adjusting a flow volume of warm/cold water to be spouted from the faucet device 1. The water amount adjusting button 42 includes a water increasing button 42*a* and a water reducing button 42*b*. The water increasing button 42*a* is a button for increasing a flow volume of warm/cold water. The water reducing button 42*b* is a button for reducing a flow volume of warm/cold water. The remote controller 4 causes a second display 45*b* to display a setting state of a water amount of warm/cold water. In a case where the water increasing button 42*a* or the water reducing button 42*b* is operated, displaying of the second display 45*b* changes in accordance with operations with respect to the buttons 42*a* and 42*b*. Note that a flow volume of warm/cold water spouted from the faucet device 1 can be adjusted within a predetermined flow volume range.

The switching button 43 is a button for switching between spouting and stopping of warm/cold water in the faucet device 1. The switching button 43 is a button for changing a water spouting part of warm/cold water in the faucet device 1. The switching button 43 includes a faucet button 43*a*, a hand shower button 43*b*, an overhead shower button 43*c*, and a warm pillar button 43*d*. Each of the buttons 43*a* to 43*d* is switched between "ON" and "OFF" by a user depressing the corresponding button.

In a case where the buttons 43*a* to 43*d* of the switching button 43 are turned "OFF", warm/cold water is not spouted. In other words, the faucet device 1 is in a water stopping state.

In a case where one of the switching button 43 is depressed and further the depressed switching button 43 is turned "ON" from a state where the buttons 43*a* to 43*d* of the switching button 43 are turned "OFF", warm/cold water is spouted. In other words, the faucet device 1 is turned from a water stopping state into a water spouting state.

In a case where one of the switching button 43 is depressed in a state where another of the switching button 43 is turned "ON", the switching button 43 to be turned "ON" is changed so as to change a water spouting part of warm/cold water.

For example, in a case where the hand shower button 43*b* is turned "ON", warm/cold water is spouted from the hand shower 22. In this state, in a case where the faucet button 43*a* is depressed, the hand shower button 43*b* is turned "OFF", and further the faucet button 43*a* is turned "ON". Thus, a water spouting part of warm/cold water is changed from the hand shower 22 into the faucet 21, and warm/cold water is spouted from the faucet 21.

In a case where the switching button 43 having been turned "ON" is depressed again, the depressed switching button 43 is turned "OFF", and the buttons 43*a* to 43*d* of the switching button 43 are turned "OFF" so as to stop spouting warm/cold water. In other words, the faucet device 1 is turned from a water spouting state into a water stopping state.

Note that each of the buttons 43*a* to 43*d* is configured such that a user is able to identify "ON" and "OFF" states of the corresponding button. For example, the switching button 43 having been turned "ON" lights up, and further the switching button 43 having been turned "OFF" blacks out.

Herein, the faucet device 1 is explained as one example which is capable of spouting warm/cold water from the overhead shower 23, the warm pillar 24, the hand shower 22, and the faucet 21; however, not limited thereto. For example, the faucet device 1 may have a configuration without the overhead shower 23 and the warm pillar 24.

Figure 3:
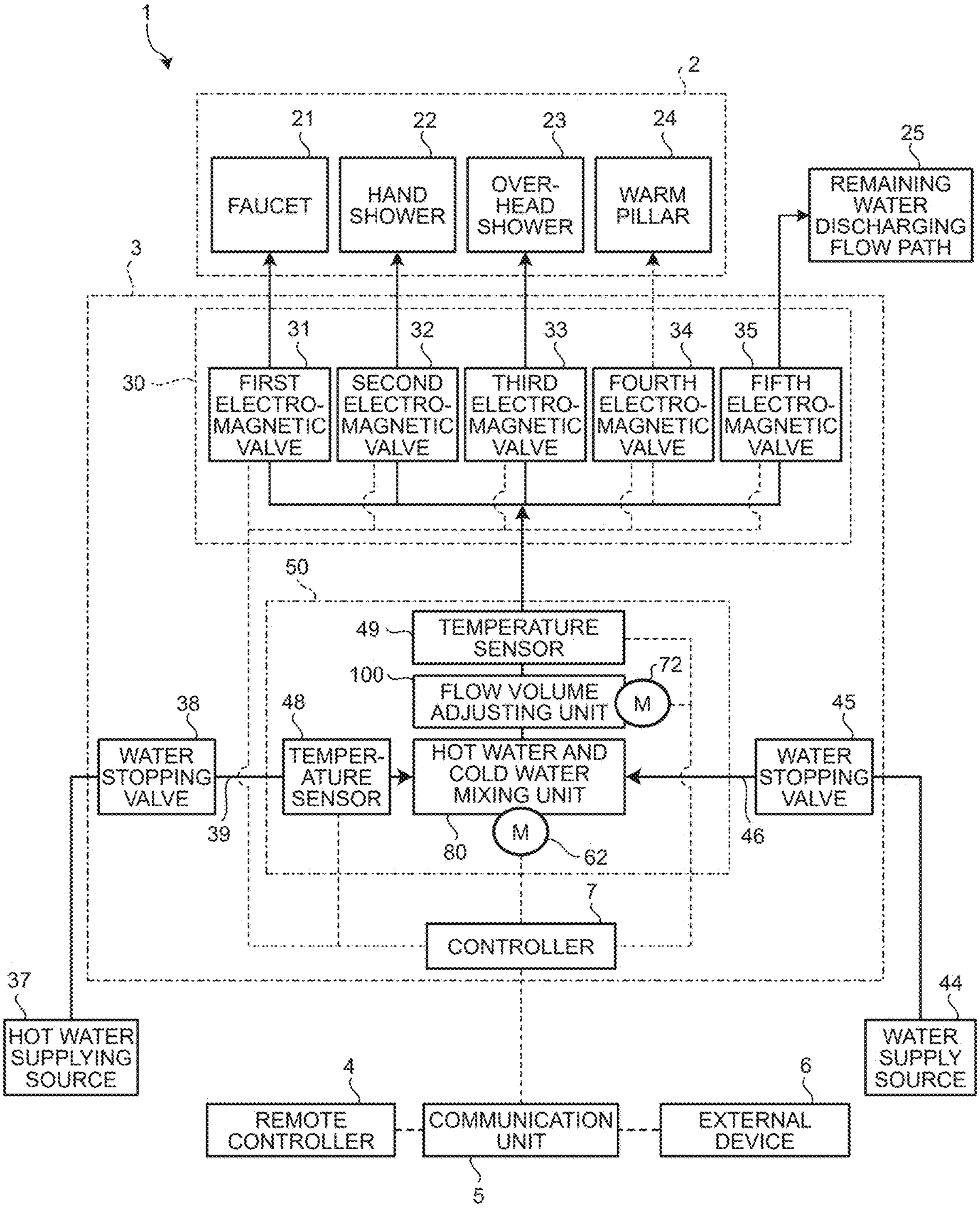
FIG. 3 is a block diagram illustrating the outline of a faucet device according to the embodiment.

Next, the outline of the faucet device 1 according to the embodiment will be explained with reference to FIG. 3. FIG. 3 is a block diagram illustrating the outline of the faucet device 1 according to the embodiment. In FIG. 3, flows of warm/cold water are indicated by arrows of solid lines, and communication lines are indicated by dashed lines.

The faucet device 1 includes a plurality of water spout parts 2, the faucet body 3, the remote controller 4, and a communication unit 5.

The plurality of water spout parts 2 includes the faucet 21, the hand shower 22, the overhead shower 23, the warm pillar 24, and the hot water waiting water spout port 25*a* (see FIG. 1) that is connected to a remaining water discharging flow path 25.

The faucet body 3 includes a combination faucet unit 50, a spout water switching unit 30, and the controller 7.

The combination faucet unit 50 includes a hot water and cold water mixing unit 80, a flow volume adjusting unit 100, a temperature sensor 48, and a temperature sensor 49. Hot water is supplied to the hot water and cold water mixing unit 80 from a hot water supplying source 37. Cold water is supplied to the hot water and cold water mixing unit 80 from a water supply source 44. The temperature sensor 48 is arranged on upstream of the hot water and cold water mixing unit 80 so as to detect a temperature of hot water that is supplied from the hot water supplying source 37. The temperature sensor 49 is arranged on downstream of the hot water and cold water mixing unit 80 so as to detect a temperature of warm/cold water that is spouted from the hot water and cold water mixing unit 80. A water stopping valve 38 is arranged on a hot water supplying path 39 between the hot water and cold water mixing unit 80 and the hot water supplying source 37. A water stopping valve 45 is arranged on a water supplying path 46 between the hot water and cold water mixing unit 80 and the water supply source 44.

The hot water and cold water mixing unit 80 mixes hot water supplied from the hot water supplying source 37 and cold water supplied from the water supply source 44 with each other. Specifically, the hot water and cold water mixing unit 80 switches between whether or not hot water is mixed to cold water. The hot water and cold water mixing unit 80 adjusts a ratio of hot water to be mixed to cold water, so as to adjust a temperature of mixed hot water.

The hot water and cold water mixing unit 80 includes a motor 62. The motor 62 is a stepping motor, for example, and a rotational position (namely, drive amount) of the motor 62 is controlled by the number of steps. The motor 62 operates in accordance with an operation with respect to the temperature adjusting button 41 of the remote controller 4 so as to drive a temperature adjusting valve 82 (see valve body illustrated in FIG. 6), and the hot water and cold water mixing unit 80 switches between whether or not hot water is mixed to cold water.

The motor 62 operates in accordance with an operation with respect to the temperature adjusting button 41 of the remote controller 4 so as to drive the temperature adjusting valve 82 (see FIG. 6), and the hot water and cold water mixing unit 80 adjusts a ratio of hot water to be mixed to cold water. Even in a case where the temperature adjusting button 41 is not operated, for example, when a temperature of hot water changes so as to change a temperature of mixed hot water, the hot water and cold water mixing unit 80 adjusts a ratio between a flow volume of hot water and a flow volume of cold water in accordance with the temperature of mixed hot water, so that it is possible to automatically adjust a temperature of mixed hot water.

Warm/cold water flows into the flow volume adjusting unit 100 from the hot water and cold water mixing unit 80. In a case where warm/cold water is spouted from the water spout parts 2, the flow volume adjusting unit 100 adjusts a flow volume of warm/cold water to be spouted.

The flow volume adjusting unit 100 includes a motor 72. The motor 72 is a stepping motor, for example, a rotational position (namely, drive amount) of the motor 62 is controlled by the number of steps. In accordance with an operation with respect to the water amount adjusting button 42 of the remote controller 4, the motor 72 drives so as to drive a flow adjusting valve 102 (see FIG. 6), and the flow volume adjusting unit 100 adjusts a flow volume of warm/cold water.

The spout water switching unit 30 switches between spouting and stopping of warm/cold water to be discharged from the combination faucet unit 50. In other words, the spout water switching unit 30 switches between spouting and stopping of warm/cold water from the water spout parts 2. The spout water switching unit 30 changes a water spouting part of warm/cold water. The faucet device 1 causes the spout water switching unit 30 to execute switching between spouting and stopping of warm/cold water from the water spout part 2, and further causes the flow volume adjusting unit 100 to adjust a flow volume of warm/cold water when warm/cold water is spouted.

The spout water switching unit 30 includes a plurality of electromagnetic valves 31 to 35. Specifically, the spout water switching unit 30 includes the first electromagnetic valve 31, the second electromagnetic valve 32, the third electromagnetic valve 33, the fourth electromagnetic valve 34, and the fifth electromagnetic valve 35.

Each of the first electromagnetic valve 31 to the fourth electromagnetic valve 34 is turned into "closed (OFF)" or "open (ON)" in accordance with an operation with respect to the switching button 43.

In a case where the first electromagnetic valve 31 to the fourth electromagnetic valve 34 are "closed", warm/cold water is not spouted from the faucet 21, the hand shower 22, the overhead shower 23, or the warm pillar 24. In a case where one of the first electromagnetic valve 31 to the fourth electromagnetic valve 34 is "open", warm/cold water is spouted from one of the faucet 21, the hand shower 22, the overhead shower 23, and the warm pillar 24, which is corresponding to the "open" electromagnetic valve.

The first electromagnetic valve 31 switches between spouting and stopping of warm/cold water from the faucet 21. The second electromagnetic valve 32 switches between spouting and stopping of warm/cold water from the hand shower 22. The third electromagnetic valve 33 switches between spouting and stopping of warm/cold water from the overhead shower 23. The fourth electromagnetic valve 34 switches between spouting and stopping of warm/cold water from the warm pillar 24.

For example, in a case where the first electromagnetic valve 31 is "open" and the second electromagnetic valve 32 to the fourth electromagnetic valve 34 are "closed", warm/cold water is spouted from the faucet 21.

The fifth electromagnetic valve 35 is switched between "closed (OFF)" and "open (ON)" in accordance with a change in a mode for spouting water by the remote controller 4 or an operation by an external device 6 (for example, remote controller arranged in water closet). The fifth electromagnetic valve 35 is a valve for discharging water remaining in a hose of the hand shower 22 or the like and/or a pipe, and further is usually kept "closed". In other words, the fifth electromagnetic valve 35 is turned into "open" in processing remaining water. In a case where the fifth electromagnetic valve 35 is turned into "open", remaining water is discharged from the hot water waiting water spout port 25*a* via the remaining water discharging flow path 25.

In accordance with an operation of the faucet body 3 which is received by an operation of the remote controller 4, the controller 7 controls the motors 62 and 72, and the first electromagnetic valve 31 to the fourth electromagnetic valve 34. In accordance with an operation of the remote controller 4 and/or the external device 6, for example, the controller 7 controls the fifth electromagnetic valve 35.

The controller 7 is a controller. The controller 7 includes a microcomputer including a Central Processing Unit (CPU), a Read Only Memory (ROM), a Random Access Memory (RAM), and the like; and various circuits, for example. Note that the controller 7 may include hardware such as an Application Specific Integrated Circuit (ASIC) and a Field Programmable Gate Array (FPGA).

The communication unit 5 receives an operation signal from the remote controller 4 and the external device 6, and further transmits the received operation signal to the controller 7. The remote controller 4 and the external device 6 are connected to the communication unit 5 by wired communication or wireless communication. The controller 7 is connected to the communication unit 5 by using wired communication or wireless communication.

Figure 4:
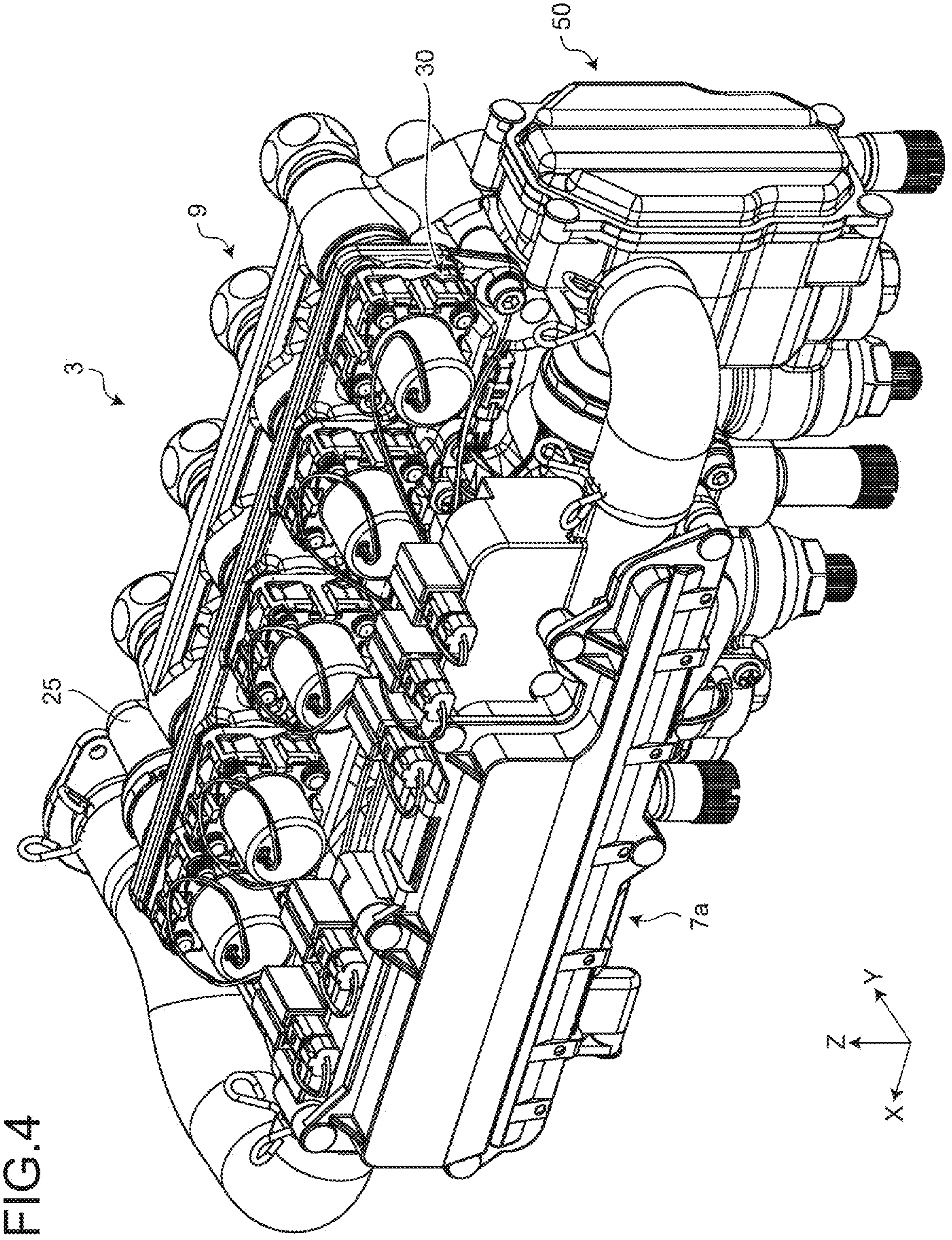
FIG. 4 is a perspective view illustrating a faucet body.

Next, the faucet body 3 will be explained with reference to FIG. 4. FIG. 4 is a perspective view illustrating the faucet body 3. The faucet body 3 includes a flow path unit 9 in addition to the combination faucet unit 50, the spout water switching unit 30, and the controller 7 (see FIG. 3). The faucet body 3 is attached to the wall part 14*a* (see FIG. 1) of the bath unit 10 by the flow path unit 9.

The flow path unit 9 includes the hot water supplying path 39 (see FIG. 3) that causes hot water supplied from the hot water supplying source 37 (see FIG. 3) to flow into the combination faucet unit 50, the water supplying path 46 (see FIG. 3) that causes cold water supplied from the water supply source 44 (see FIG. 3) to flow into the combination faucet unit 50, and a flow path that causes warm/cold water to flow into the water spout parts 2 from the combination faucet unit 50. Note that the flow path unit 9 is provided with the spout water switching unit 30. The flow path unit 9 is provided with the water stopping valves 38 and 45 (see FIG. 3). The flow path unit 9 is provided with the remaining water discharging flow path 25.

In the faucet body 3, the flow path unit 9 is arranged in a back portion thereof, and the combination faucet unit 50 is arranged in front of the flow path unit 9. A part of the flow path unit 9 is arranged above the combination faucet unit 50. A control box 7*a* housing therein the controller 7 is arranged in front of the combination faucet unit 50.

Figure 5:
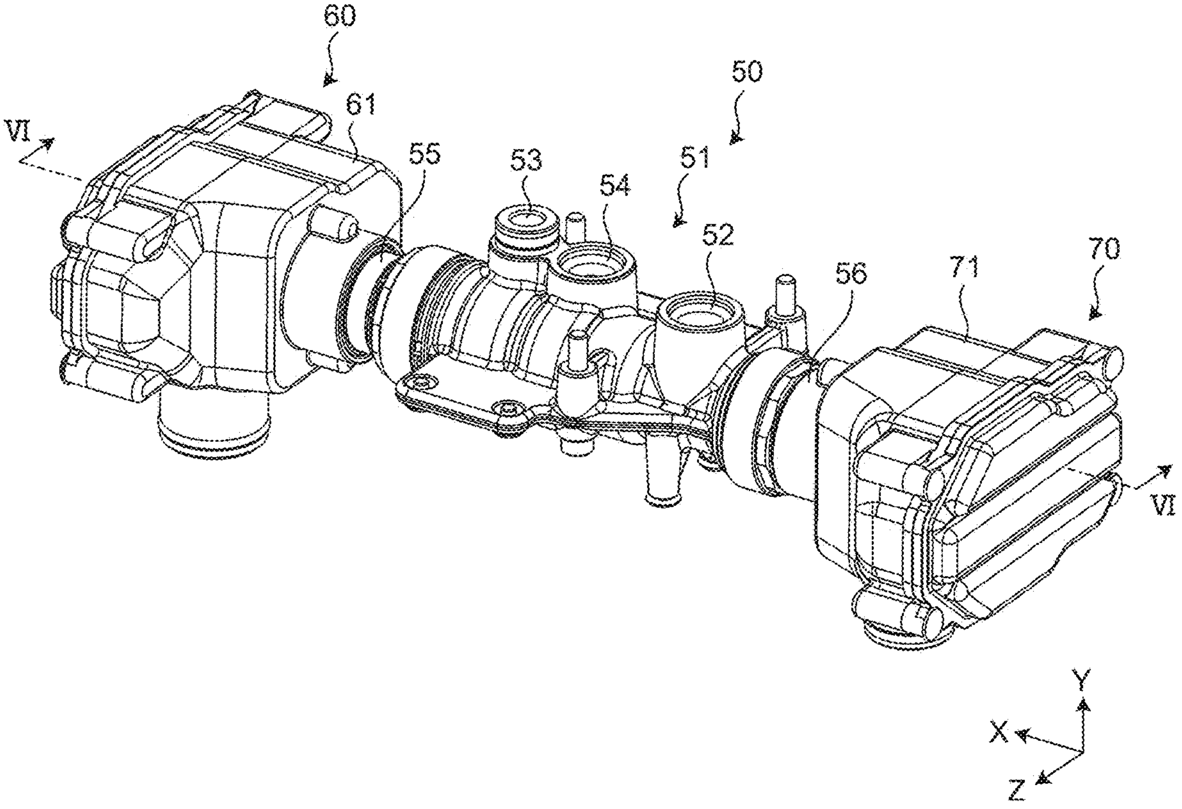
FIG. 5 is a perspective view illustrating a combination faucet unit.
Figure 6:
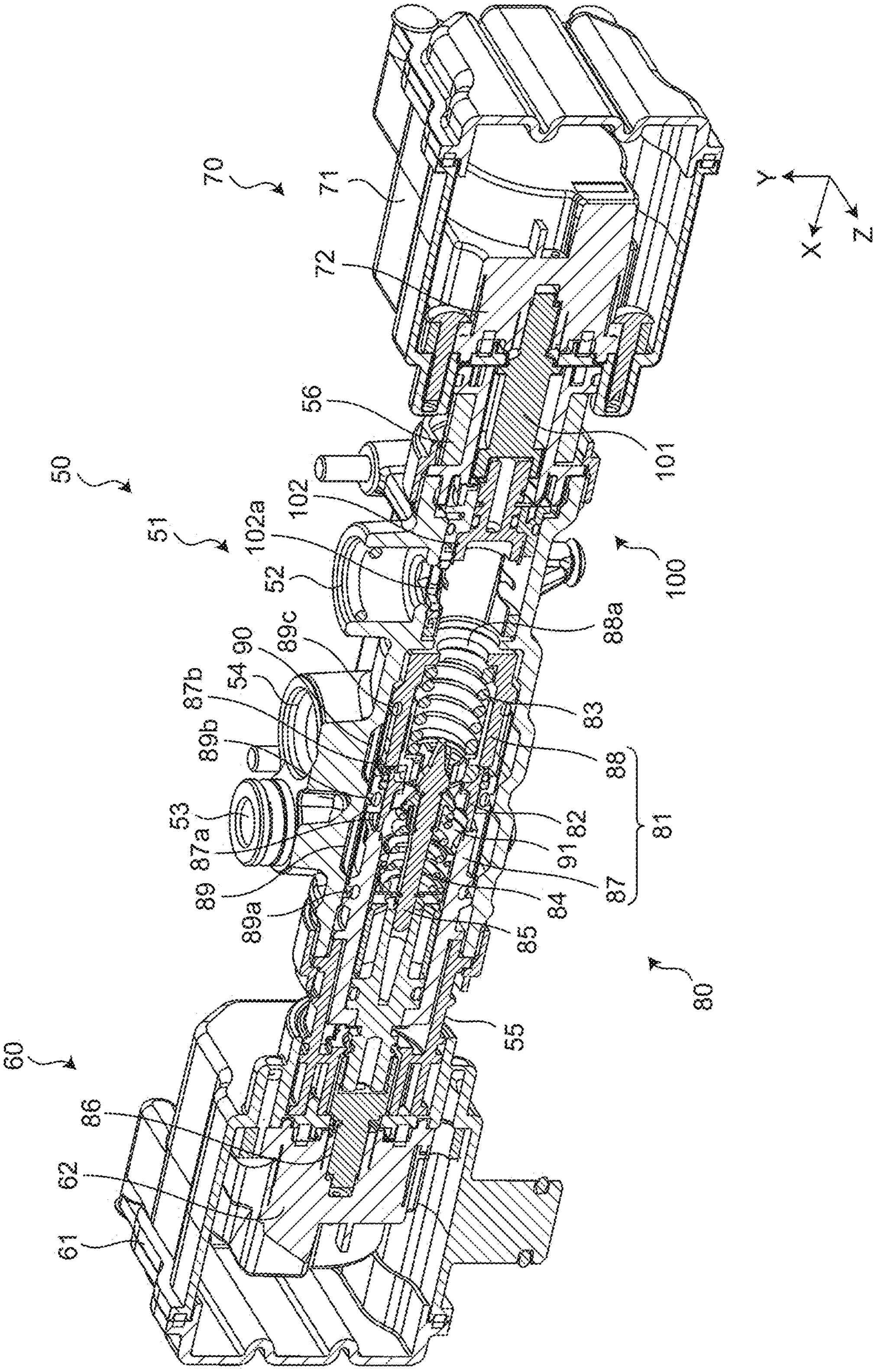
FIG. 6 is a perspective cross sectional view taken along a line VI-VI illustrated in FIG. 5.

Next, with reference to FIG. 5 and FIG. 6, the combination faucet unit 50 will be more specifically explained. FIG. 5 is a perspective view illustrating the combination faucet unit 50. FIG. 6 is a perspective cross sectional view taken along a line VI-VI illustrated in FIG. 5.

As illustrated in FIG. 5 and FIG. 6, the combination faucet unit 50 includes a unit body 51, a temperature adjusting side motor unit 60, a flow adjusting side motor unit 70, the hot water and cold water mixing unit 80, and the flow volume adjusting unit 100. In the combination faucet unit 50, the unit body 51 is provided with a water spout port 52 so as to spout warm/cold water from the water spout port 52.

The unit body 51 extends in the left-right direction. The hot water and cold water mixing unit 80 and the flow volume adjusting unit 100 are inserted into the unit body 51 in the left-right direction. In other words, insertion directions of the hot water and cold water mixing unit 80 and the flow volume adjusting unit 100 coincide with the left-right direction.

A hot water supplying port 53 connected to the hot water supplying path 39 (see FIG. 3) is arranged on the left side of the unit body 51. A cold water supplying port 54 connected to the water supplying path 46 (see FIG. 3) is arranged in an intermediate portion in the left-right direction of the unit body 51. In the unit body 51, the hot water supplying port 53 and the cold water supplying port 54 are adjacently formed in the left-right direction.

The temperature adjusting side motor unit 60 includes a cover 61 and the motor 62, and further is arranged in a left edge of the unit body 51. The cover 61 is arranged in a left edge of the unit body 51 via a spacer 55. The motor 62 is arranged in the cover 61. The flow adjusting side motor unit 70 includes a cover 71 and the motor 72, and further is arranged in a right edge of the unit body 51. The cover 71 is arranged in a right edge of the unit body 51 via a spacer 56. The motor 72 is arranged in the cover 71.

The motor 62 is an actuator that causes the hot water and cold water mixing unit 80 to operate. The motor 62 switches between whether or not mixing cold water and hot water in accordance with a rotational position (namely, drive amount) of the motor 62. In a case where spouting mixed hot water, the motor 62 sets a temperature of mixed hot water in accordance with a rotational position (namely, drive amount) of the motor 62. The motor 72 adjusts a flow volume of warm/cold water in accordance with a rotational position (namely, drive amount) of the motor 72.

The hot water and cold water mixing unit 80 includes a body casing 81, the temperature adjusting valve 82, a thermo-sensitive spring 83 (namely, thermo-sensitive energizing part), a bias spring 84, a liner 85, and a spindle 86.

The body casing 81 includes a first body casing 87 and a second body casing 88. A hot water inlet 87*a* that is a hot water inlet with respect to an internal space of the body casing 81, and a cold water inlet 87*b* that is a cold water inlet with respect to the above-mentioned internal space are formed on a peripheral wall of the first body casing 87. A mixed hot water and cold water outlet 88*a* is formed in a right end part of the second body casing 88. The hot water inlet 87*a*, the cold water inlet 87*b*, and the mixed hot water and cold water outlet 88*a* are hole parts via which the internal space of the body casing 81 is communicated with the outside. In an intermediate portion of the body casing 81 in the left-right direction, the hot water inlet 87*a* and the cold water inlet 87*b* are formed such that the hot water inlet 87*a* is located on the left side of the cold water inlet 87*b*.

An outer peripheral space of the body casing 81 is partitioned by O-rings 89*a*, 89*b*, and 89*c* that are sealing members. Thus, a hot water dedicated circular flow path 89 facing the hot water inlet 87*a* and a cold water dedicated circular flow path 90 facing the cold water inlet 87*b* are formed in the outer peripheral space of the body casing 81.

A spout water flow path 91 is formed in an internal space of the body casing 81. The spout water flow path 91 can be communicated with the water spout port 52 via the mixed hot water and cold water outlet 88*a* and the flow adjusting valve 102.

The thermo-sensitive spring 83 is housed in the second body casing 88. The thermo-sensitive spring 83 is arranged in the spout water flow path 91. The thermo-sensitive spring 83 is a spring whose spring constant changes in accordance with the temperature, for example, and further is made of Shape Memory Alloy (SMA). The thermo-sensitive spring 83 energizes the temperature adjusting valve 82 towards the left side.

The bias spring 84 is housed in the first body casing 87 arranged in the left portion of the second body casing 88. The bias spring 84 is arranged in the spout water flow path 91. The bias spring 84 is a spring whose spring constant is substantially constant with respect to the temperature. The bias spring 84 energizes the temperature adjusting valve 82 towards the right side.

The temperature adjusting valve 82 is arranged in the first body casing 87 on the right side thereof. The temperature adjusting valve 82 is incorporated into the first body casing 87 to be able to slide along an axial direction (namely, left-right direction) thereof. The temperature adjusting valve 82 moves along the left-right direction in accordance with an energizing force of the bias spring 84 and an energizing force of the thermo-sensitive spring 83 so as to adjust a communication state between the hot water dedicated circular flow path 89 and the cold water dedicated circular flow path 90, and the spout water flow path 91.

Specifically, the temperature adjusting valve 82 is held at a position where an energizing force of the bias spring 84 and an energizing force of the thermo-sensitive spring 83 balance with each other. An open degree of the hot water inlet 87*a* is larger and further an open degree of the cold water inlet 87*b* is smaller as the temperature adjusting valve 82 further moves towards the right side, and thus an amount of hot water supplied to the spout water flow path 91 increases so as to reduce an amount of cold water, and thus a temperature of mixed hot water rises. An open degree of the hot water inlet 87*a* is smaller and further an open degree of the cold water inlet 87*b* is larger as the temperature adjusting valve 82 further moves towards the left side, and thus an amount of hot water supplied into the body casing 81 reduces so as to increase an amount cold water, and thus a temperature of mixed hot water reduces.

The liner 85 is in contact with an edge of the bias spring 84 on a side opposite to the temperature adjusting valve 82, and further is connected with the motor 62 via the spindle 86. The spindle 86 converts rotational movement of the motor 62 into linear movement of the liner 85 in the left-right direction. Thus, the liner 85 moves in the left-right direction in accordance with rotation of the motor 62.

In the hot water and cold water mixing unit 80, the liner 85 moves in the left-right direction in accordance with a rotational position of the motor 62, so as to change a position of a left edge of the bias spring 84. Thus, in accordance with a rotational position of the motor 62, the hot water and cold water mixing unit 80 is capable of changing a position of the temperature adjusting valve 82 where an energizing force of the bias spring 84 and an energizing force of the thermo-sensitive spring 83 balance with each other. Therefore, in a case where spouting mixed hot water, the hot water and cold water mixing unit 80 is capable of setting a temperature of the mixed hot water to a temperature according to a rotational position of the motor 62.

For example, in a case where a temperature of hot water is changed to change a temperature of mixed hot water in spouting the mixed hot water, the thermo-sensitive spring 83 expands or contracts in accordance with the temperature of mixed hot water, and the temperature adjusting valve 82 moves in the left-right direction so as to automatically change the balanced position of the temperature adjusting valve 82. Therefore, amounts of hot water and cold water flowing into the spout water flow path 91 are adjusted so as to automatically adjust a temperature of mixed hot water.

The flow volume adjusting unit 100 includes a spindle 101 and the flow adjusting valve 102. One edge of the spindle 101 is connected with the motor 72, and the other edge thereof is connected with the flow adjusting valve 102.

The flow adjusting valve 102 is arranged in the spout water flow path 91. The flow adjusting valve 102 is rotated in accordance with rotation of the motor 72. A communication opening 102*a* is formed in the flow adjusting valve 102. The flow adjusting valve 102 is arranged so as to face the water spout port 52 of the unit body 51. The flow adjusting valve 102 is rotated in accordance with rotation of the motor 72, and further changes a communication area between the communication opening 102*a* and the water spout port 52 so as to change a flow volume.

Specifically, in a case where the motor 72 locates in a predetermined water stopping position, the communication opening 102*a* is not communicated with the water spout port 52. Thus, in a case where the motor 72 locates in the predetermined water stopping position, warm/cold water is not spouted from the water spout part 2.

In a case where the motor 72 rotates towards a water spouting position from a water stopping position, for example, the communication opening 102*a* becomes communicated with the water spout port 52. Thus, warm/cold water is spouted from the water spout port 52.

The flow adjusting valve 102 is capable of changing an area in which the communication opening 102*a* and the water spout port 52 are communicated with each other, in accordance with a rotational position of the motor 72. In other words, the flow volume adjusting unit 100 is capable of adjusting a flow volume of warm/cold water to be spouted from the water spout parts 2, in accordance with a rotational position of the motor 72.

Note that in temperature and flow adjusting control of the faucet device 1, the controller 7 does not execute a fine adjustment by using feedback control. In a case where a water spouting state is changed into a water stopping state, a process for returning to original positions (namely, positions to be control reference) of the motors 62 and 72 for each time of stopping water is not executed, step-out or the like occurs to be gradually accumulated, and thus open degrees of positions of the motors 62 and 72 are supposed to be shifted. In order to avoid the above-mentioned case, the controller 7 executes "origin searching" that is a process for returning positions of the motor 62 and the motor 72 to original positions thereof at predetermined time intervals, during calibration, or the like.

Figure 7:
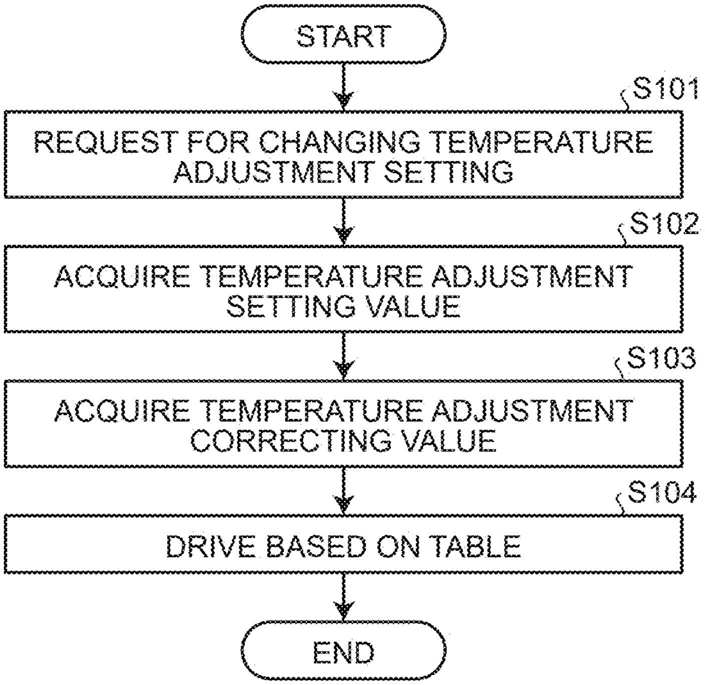
FIG. 7 is a flowchart illustrating a processing procedure for temperature controlling in a water spouting mode.
Figure 8:
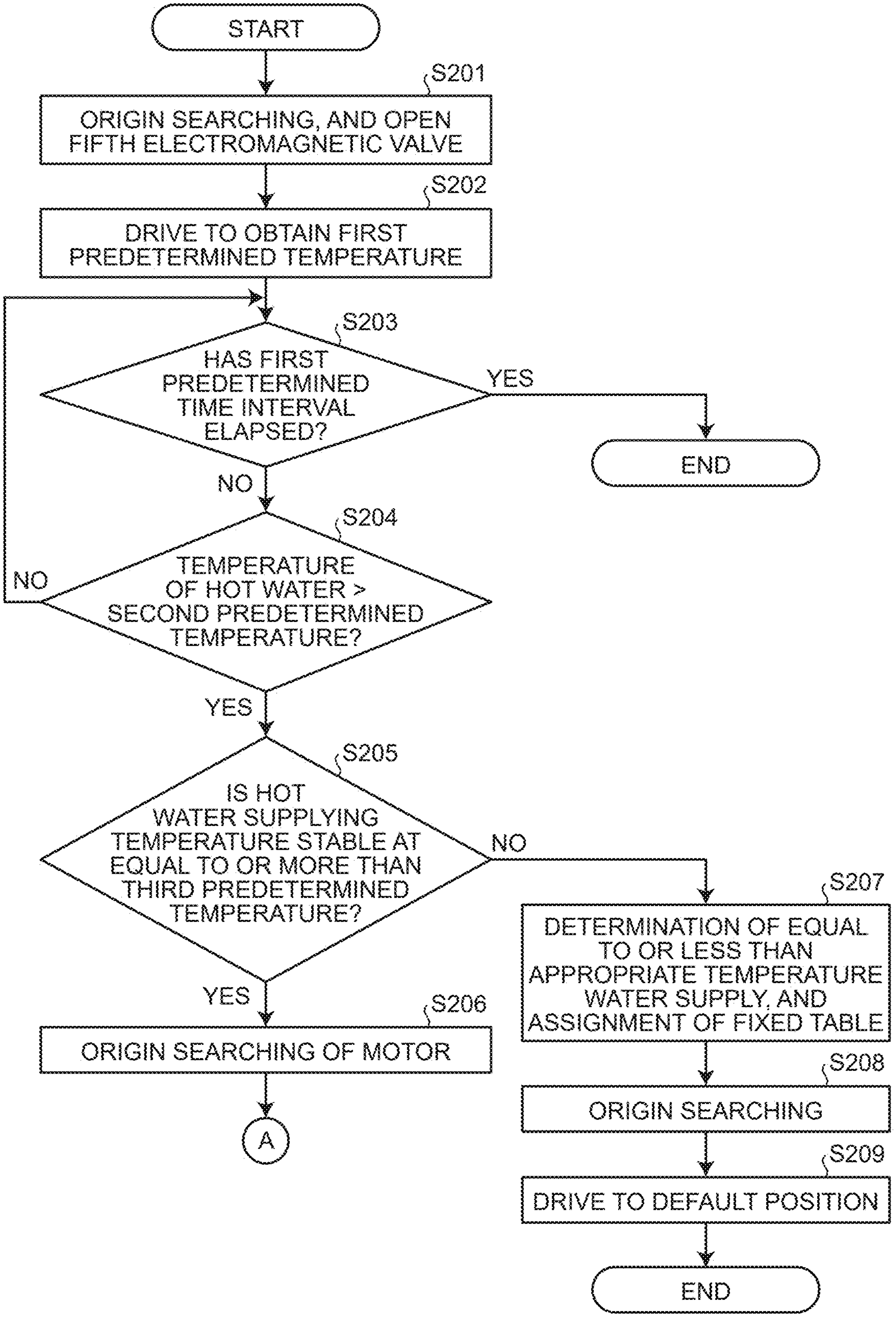
FIG. 8 is a flowchart illustrating a processing procedure for an initial process and a supplied hot water temperature determining process in a calibration mode.
Figure 9:
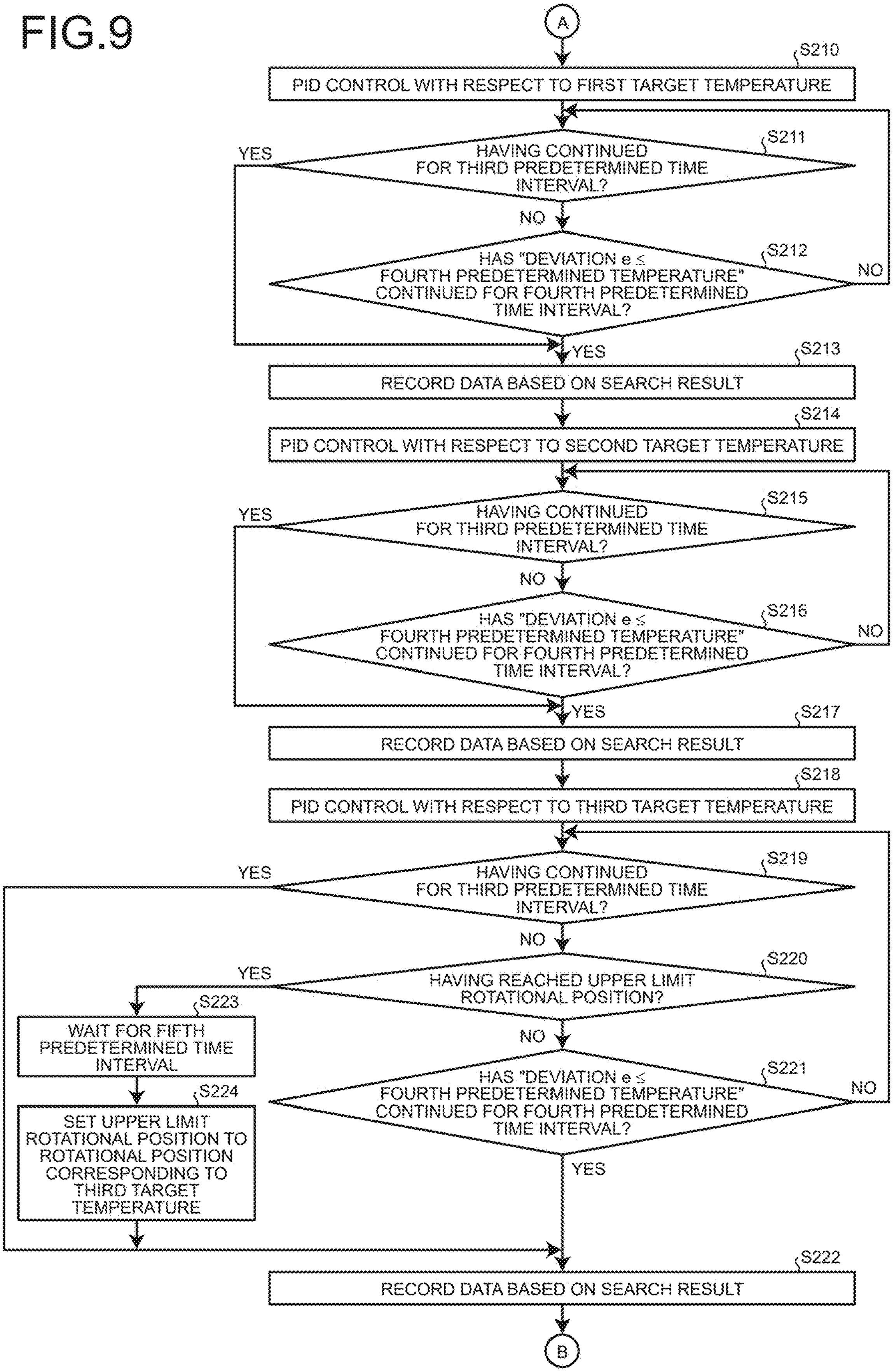
FIG. 9 is a flowchart illustrating a processing procedure for a normal optimizing process in the calibration mode.
Figure 10:
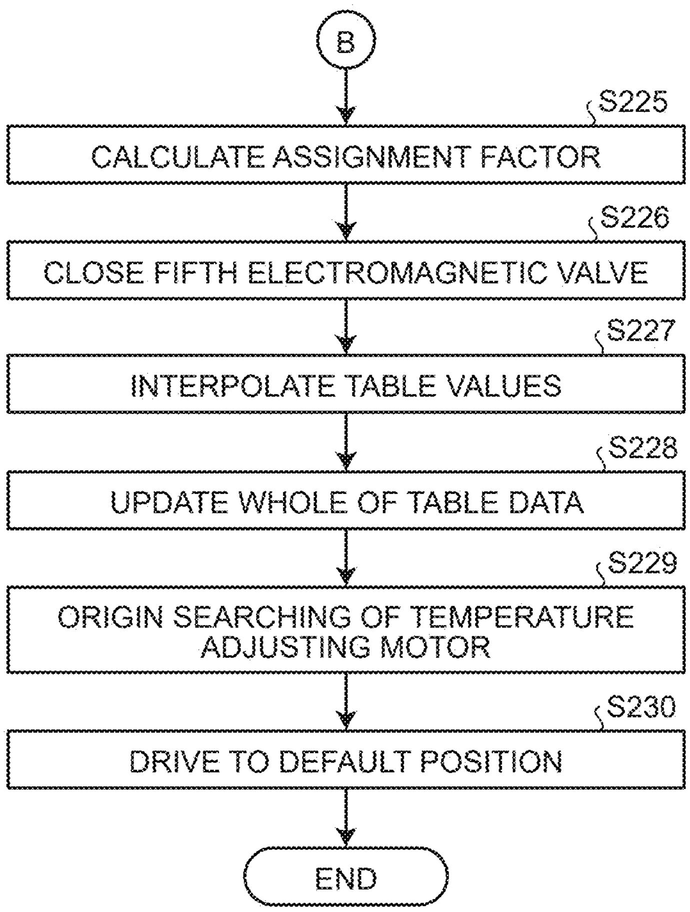
FIG. 10 is a flowchart illustrating a processing procedure for a temperature adjustment table assigning process in the calibration mode.
Figure 11:
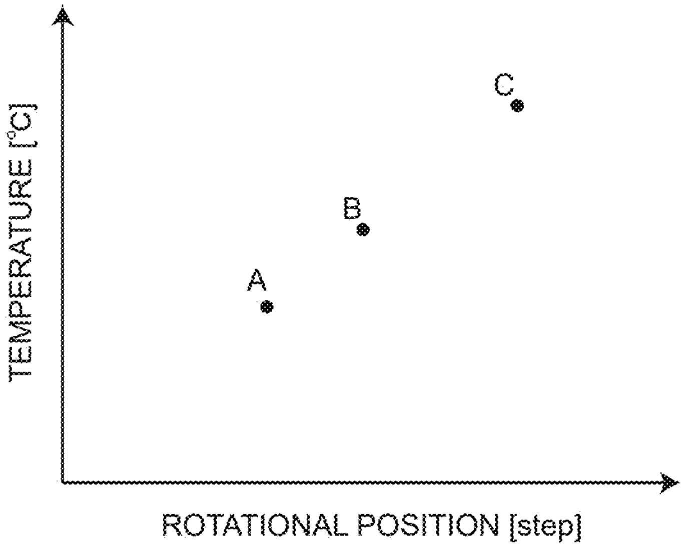
FIG. 11 is a diagram illustrating calculation of an assignment factor.
Figure 12:
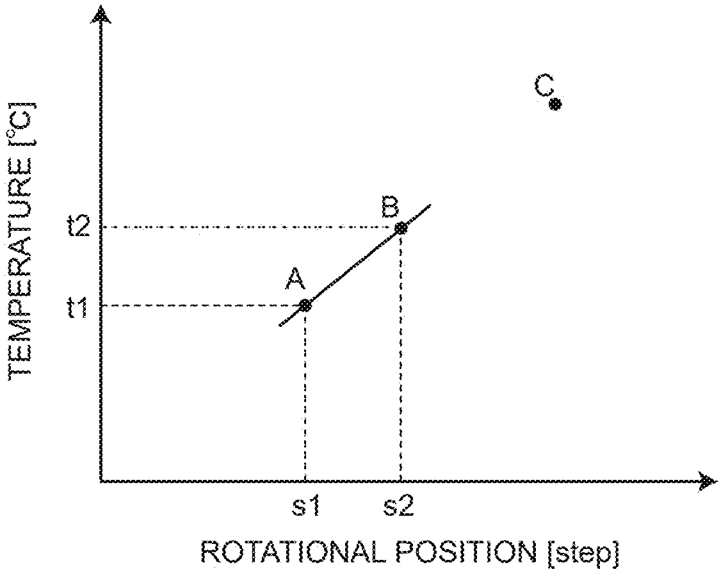
FIG. 12 is a diagram illustrating calculation of an assignment factor.
Figure 13:
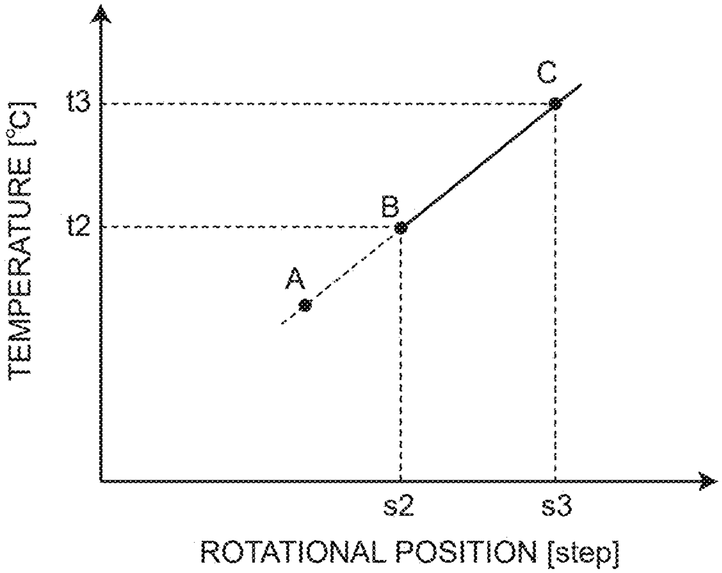
FIG. 13 is a diagram illustrating calculation of an assignment factor.

Next, temperature controlling of the faucet device 1 will be explained with reference to FIG. 7 to FIG. 13. FIG. 7 is a flowchart illustrating a processing procedure for temperature controlling in a water spouting mode. FIG. 8 is a flowchart illustrating a processing procedure for an initial process and a supplied hot water temperature determining process in a calibration mode. FIG. 9 is a flowchart illustrating a processing procedure for a normal optimizing process in the calibration mode. FIG. 10 is a flowchart illustrating a processing procedure for a temperature adjustment table assigning process in the calibration mode. FIG. 11 to FIG. 13 are diagrams illustrating calculation of assignment factors.

The controller 7 is capable of executing a "water spouting mode" and a "calibration mode". The "water spouting mode" is a mode for driving, in a case where receiving information on a set temperature from the remote controller 4, the motor 62 to a predetermined rotational position or by a predetermined drive amount alone, which is corresponding to the set temperature so as to adjust a position of the temperature adjusting valve 82 in an axial direction thereof. The "calibration mode" is a mode for adjusting setting of a predetermined rotational position or a predetermined drive amount in accordance with at least one of an arrangement environment (for example, water pressure, hot water supplying temperature) and product unevenness.

A processing procedure for temperature adjustment in the "water spouting mode" will be first explained.

As illustrated in FIG. 7, the controller 7 receives a request for changing temperature adjustment setting from the remote controller 4 (Step S101).

Next, the controller 7 acquires a temperature adjustment setting value from the remote controller 4 (Step S102). The temperature adjustment setting value means a value of a set temperature which is transmitted from the remote controller 4.

Next, the controller 7 acquires a temperature adjustment correcting value from the remote controller 4 (Step S103). The temperature adjustment correcting value is a value for correcting a temperature adjustment setting value into a higher temperature or a lower temperature. The temperature adjustment correcting value is preliminarily set by the remote controller 4.

Next, the controller 7 drives the motor 62 into a predetermined rotational position on the basis of a temperature adjusting open degree table (Step S104), and further ends the processing. The temperature adjusting open degree table means data that stores therein set temperatures and rotational positions of the motor 62 in association with each other, for example. For example, in a case where a temperature adjustment setting value is 40° C. and a temperature adjustment correcting value is +1° C., the controller 7 refers to a table value (namely, rotational position) at 41° C. in the temperature adjusting open degree table.

According to such temperature controlling, the faucet device 1 does not have to always recognize the present output, unlike feedback control. Moreover, the faucet device 1 does not loop the processing, so that it is possible to execute implementation by simple processing.

Next, the "calibration mode" will be specifically explained. The "calibration mode" is executed by an operation by a user with respect to the remote controller 4. Specifically, in a case where a user simultaneously holds down a low temperature button 41*b* and the water increasing button 42*a* of the remote controller 4 for three seconds so as to shift to a set screen, and then selects "calibration" from the set screen; a display (not illustrated) displays thereon execution necessity of the "calibration mode". In a case where a user selects "execute calibration mode" in the remote controller 4, the calibration mode is executed. During execution of the calibration mode, the remote controller 4 causes the display (not illustrated) to display "executing calibration mode". Calibration can be executed by the remote controller 4 that is used in common water spouting operations, and thus the faucet device 1 does not need a dedicated setting remote controller. Note that execution of the calibration mode may be temporarily interrupted or cancelled during execution of the calibration mode by an operation of a user with respect to the remote controller 4.

In the "calibration mode", an initial process (Step S201 to Step S204) and a supplied hot water temperature determining process (Step S205 to Step S209) are first executed.

As illustrated in FIG. 8, the controller 7 executes origin searching on the motors 62 and 72, and further opens the fifth electromagnetic valve 35 (Step S201). The faucet device 1 opens the fifth electromagnetic valve 35 so as to execute calibration while spouting water from the hot water waiting water spout port 25*a*. The controller 7 drives the motor 62 while recognizing environment in actually spouting water, so that it is possible to improve the accuracy in the calibration.

Next, the controller 7 drives the motor 62 so as to obtain a first predetermined temperature (Step S202). For example, the first predetermined temperature is set to 42° C.

Next, the controller 7 determines whether or not the first predetermined time interval has elapsed since the motor 62 is driven (Step S203). For example, the first predetermined time interval is set to five minutes.

In a case where determining that the first predetermined time interval has elapsed since the motor 62 is driven (Step S203: Yes), the controller 7 ends the calibration process. In this case, the controller 7 ends the processing without updating the temperature adjusting open degree table.

In a case where determining that the first predetermined time interval has not elapsed since the motor 62 is driven (Step S203: No), the controller 7 determines whether or not a temperature (namely, hot water temperature) of hot water detected by the temperature sensor 48 is higher than a second predetermined temperature (Step S204). For example, the second predetermined temperature is set to 32° C. The determination in Steps S203 and S204 is objected to determination of whether or not a power source of a hot water supplying device, which is the hot water supplying source 37, is turned ON.

In a case where determining that a temperature of hot water detected by the temperature sensor 48 is equal to or less than the second predetermined temperature (Step S204: No), the controller 7 returns the processing to Step S203.

In a case where determining that a temperature of hot water detected by the temperature sensor 48 is higher than the second predetermined temperature (Step S204: Yes), the controller 7 determines whether or not a hot water supplying temperature is stable at equal to or more than a third predetermined temperature (Step S205). For example, the controller 7 is capable of determining whether or not a hot water supplying temperature is stable, on the basis of the fact that a temperature of hot water detected by the temperature sensor 48 falls within a predetermined range for a predetermined time interval.

In a case where determining that a hot water supplying temperature is stable at equal to or more than the third predetermined temperature (Step S205: Yes), the controller 7 executes origin searching on the motor 62 (Step S206), and further shifts the processing to a normal optimizing process illustrated in FIG. 9. As described above, after the hot water supplying temperature becomes stable, the controller 7 starts to adjust setting of a rotational position of the motor 62. The faucet device 1 is capable of precisely executing temperature controlling in calibration while reducing effects due to heat absorption of cold cast metal in a case where the flow path unit 9 (see FIG. 4) is constituted of cast metal, and starting up of the hot water supplying device. Thus, the controller 7 is capable of improving the accuracy in calibration.

In a case where determining that a hot water supplying temperature is not stabilized at equal to or more than the third predetermined temperature (Step S205: No), the controller 7 determines that the hot water supplying temperature is equal to or less than an appropriate temperature water supply, and further assigns a fixed table to a temperature adjusting open degree table (Step S207). The fixed table is preliminarily set on the basis of evaluation data under predetermined conditions (for example, water temperature of water supplying path 46 is 15° C. and hot water temperature of hot water supplying path 39 is 40° C., which are under pressure of 0.2 MPa). As described above, in a case where a hot water supplying temperature is lower than the third predetermined temperature, the controller 7 executes controlling with the use of a dedicated table. Thus, the faucet device 1 is capable of recognizing whether or not a hot water supplying temperature is an appropriate temperature, and further is capable of causing the remote controller 4 to display whether or not the hot water supplying temperature is an appropriate temperature in accordance with a situation, so as to report it to a user. In a case where a hot water supplying temperature is lower than the third predetermined temperature, the faucet device 1 is capable of reducing a case where lukewarm hot water is spouted. Thus, the faucet device 1 is capable of avoiding reduction in usability of a user.

Next, the controller 7 executes origin searching on the motor 62 (Step S208).

Next, the controller 7 drives the motors 62 and 72 to default positions thereof (Step S209), and further ends the calibration process. For example, the default position of the motor 62 is a rotational position of the motor 62 corresponding to a center value (for example, 40° C.) of set temperature. The default position of the motor 72 is a rotational position of the motor 72 corresponding to a center value of flow volume.

Next, a processing procedure for a normal optimizing process in the "calibration mode" will be explained.

As illustrated in FIG. 9, the controller 7 executes PID control with respect to a first target temperature (Step S210). Specifically, the controller 7 calculates, by using PID control, a rotational position of the motor 62 whose target temperature is the first target temperature, and further drives the motor 62 to the calculated rotational position. For example, the first target temperature is set to 35° C. Note that PID control is employed as control for coinciding a spouted water temperature with a target temperature; however, not limited thereto, a spouted water temperature may be adjusted into the target temperature by various control methods.

Next, the controller 7 determines whether or not PID control has continued for a third predetermined time interval since the PID control of Step S210 is started (Step S211). For example, the third predetermined time interval is set to 60 seconds.

In a case where determining that the third predetermined time interval has not continued since PID control of Step S210 is started (Step S211: No), the controller 7 determines whether or not a deviation e in the PID control is equal to or less than a fourth predetermined temperature, and the state (hereinafter, may be simply referred to as "state equal to or less than fourth predetermined temperature") has continued for a fourth predetermined time interval (Step S212).

In a case where determining that a state equal to or less than the fourth predetermined temperature has not continued for the fourth predetermined time interval (Step S212: No), the controller 7 returns the processing to Step S211.

Next, in a case where determining that the third predetermined time interval has continued since PID control is started with respect to the first target temperature in Step S210 (Step S211: Yes), or in a case where determining that a state equal to or less than the fourth predetermined temperature has continued for the fourth predetermined time interval (Step S212: Yes); the controller 7 records data on the basis of search result (Step S213). Specifically, the controller 7 records, as a temperature changing point, a drive amount (namely, the number of steps) of the motor 62 and a temperature (namely, first temperature) of mixed hot water detected by the temperature sensor 49 at a timing of Step S213.

Next, the controller 7 executes PID control with respect to a second target temperature (Step S214). Specifically, the controller 7 calculates, by using PID control, a rotational position of the motor 62 whose target temperature is the second target temperature, and further drives the motor 62 to the calculated rotational position. For example, the second target temperature is set to 40° C.

Next, the controller 7 determines whether or not the third predetermined time interval has continued since PID control in Step S214 is started (Step S215).

In a case where determining that the third predetermined time interval has not continued since PID control in Step S214 is started (Step S215: No), the controller 7 determines whether or not a state equal to or less than the fourth predetermined temperature has continued for the fourth predetermined time interval (Step S216).

In a case where determining that a state equal to or less than the fourth predetermined temperature has not continued for the fourth predetermined time interval (Step S216: No), the controller 7 returns the processing to Step S215.

In a case where determining that the third predetermined time interval has continued since PID control in Step S214 is started (Step S215: Yes), or in a case where determining that a state equal to or less than the fourth predetermined temperature has continued for the fourth predetermined time interval (Step S216: Yes), the controller 7 records data on the basis of search result (Step S217). Specifically, the controller 7 records, as a temperature changing point, a drive amount (namely, the number of steps) of the motor 62 and a temperature (namely, second temperature) of mixed hot water detected by the temperature sensor 49 at a timing of Step S217.

Next, the controller 7 executes PID control with respect to a third target temperature (Step S218). Specifically, the controller 7 calculates, by using PID control, a rotational position of the motor 62 whose target temperature is the third target temperature, and further drives the motor 62 to the calculated rotational position. For example, the third target temperature is set to 45° C.

Next, the controller 7 determines whether or not the third predetermined time interval has continued since PID control in Step S218 is started (Step S219).

In a case where determining that the third predetermined time interval has continued since PID control in Step S218 is started (Step S219: No), the controller 7 determines whether or not a rotational position of the motor 62 reaches an upper limit rotational position (Step S220).

In a case where determining that a rotational position of the motor 62 does not reach the upper limit rotational position (Step S220: No), the controller 7 determines whether or not a state equal to or less than the fourth predetermined temperature has continued for the fourth predetermined time interval (Step S221).

In a case where determining that a state equal to or less than the fourth predetermined temperature has not continued for the fourth predetermined time interval (Step S221: No), the controller 7 returns the processing to Step S219.

In a case where determining that the third predetermined time interval has continued since PID control in Step S218 is started (Step S219: Yes), or in a case where a state equal to or less than the fourth predetermined temperature has continued for the fourth predetermined time interval (Step S221: Yes), the controller 7 records data on the basis of search result (Step S222), and further proceeds to a normal optimizing process illustrated in FIG. 10. Specifically, in Step S222, the controller 7 records a drive amount (namely, the number of steps) of the motor 62 and a temperature (namely, third temperature) of mixed hot water detected by the temperature sensor 49 at a timing of Step S222.

In a case where determining reaching an upper limit rotational position (Step S220: Yes), the controller 7 waits for a fifth predetermined time interval (Step S223). For example, the fifth predetermined time interval is set to 30 seconds.

Next, the controller 7 sets an upper limit rotational position to a rotational position at the third target temperature (Step S224).

Next, the controller 7 records data on the basis of search result (Step S222), and further proceeds to the normal optimizing process illustrated in FIG. 10. Specifically, in Step S222, the controller 7 records, as a temperature changing point, an upper limit rotational position of the motor 62 and a temperature (namely, third temperature) of mixed hot water detected by the temperature sensor 49.

As illustrated in FIG. 11, temperature changing points are plotted on a graph whose lateral axis indicates a rotational position of the motor 62 and whose vertical axis indicates a temperature of mixed hot water detected by the temperature sensor 49 while indicating a temperature changing point recorded in Step S213 as a point A, indicating a temperature changing point recorded in Step S217 as a point B, and indicating a temperature changing point recorded in Step S222 as a point C.

Next, a processing procedure for a temperature adjustment table assigning process in the "calibration mode" will be explained.

As illustrated in FIG. 10, the controller 7 calculates assignment factors (Step S225). Specifically, the controller 7 calculates a slope and an intercept of a linear equation of a straight line AB obtained by connecting the point A (s1, t1) and the point B (s2, t2) illustrated in FIG. 12, and further calculates a slope and an intercept of a linear equation of a straight line BC obtained by the point B (s2, t2) and the point C (s3, t3) illustrated in FIG. 13. The assignment factors include a slope and an intercept of a linear equation of the straight line AB, and a slope and an intercept of a linear equation of the straight line BC.

Next, the controller 7 closes the fifth electromagnetic valve 35 (Step S226). The controller 7 closes the fifth electromagnetic valve 35 so as to stop spouting water from the hot water waiting water spout port 25*a*.

Next, the controller 7 interpolate table values (Step S227). Specifically, on the basis of an assignment factor calculated in Step S225, the controller 7 calculates a rotational position of the motor 62 for each set temperature (namely, for each temperature to be set by remote controller 4). For example, at a set temperature equal to or less than the second target temperature, the controller 7 calculates a rotational position of the motor 62 on the basis of a linear equation of the straight line AB. At a set temperature higher than the second target temperature, the controller 7 calculates a rotational position of the motor 62 on the basis of a linear equation of the straight line BC.

Note that a rotational position of the motor 62 is calculated on the basis of three temperature changing points; however, not limited thereto, equal to or more than three temperature changing points may be searched, a linear equation of a straight line between each two of the temperature changing points in descending order of a target temperature may be calculated, and a rotational position of the motor 62 may be calculated for each set temperature similarly to the case of three points. The controller 7 uses equal to or more than three temperature changing points so as to improve the accuracy in calibration.

Next, the controller 7 updates whole of the table data (Step S228). Specifically, the controller 7 updates whole of the data on the temperature adjusting open degree table by using a rotational position of the motor 62 calculated in Step S227.

Next, the controller 7 executes origin searching on the motor 62 (Step S229).

Next, the controller 7 drives the motors 62 and 72 to default positions thereof (Step S230), and further ends the processing.

As described above, in the faucet device 1, in a case where receiving information on a set temperature, the controller 7 drives the motor 62 to a predetermined rotational position or by a predetermined drive amount alone, which is corresponding to the set temperature, so as to execute the water spouting mode for adjusting a position of the temperature adjusting valve 82 in an axial direction thereof, and the calibration mode for adjusting setting of a predetermined position or a predetermined drive amount in accordance with at least one of an arrangement environment and product unevenness.

By executing control in such a manner, the faucet device 1 is capable of adjusting, in accordance with each of scenes, a hot water temperature, a hot water pressure, a cold water temperature, and a cold water pressure from the hot water supplying path 39 and the water supplying path 46 which are different for each scene, and individual difference in temperature adjustment of an SMA thermo-valve. Thus, the faucet device 1 causes the motor 62 to move the temperature adjusting valve 82 only when changing a set temperature, and further executes temperature adjustment by using the thermo-sensitive spring 83 during spouting of water, so that it is possible to execute temperature adjustment having high accuracy according to the set temperature. The faucet device 1 is capable of achieving, as much as possible, features to be capable of shortening a time interval until a temperature becomes stable in a case where temperature change and/or pressure fluctuation occurs in supplied cold water or supplied hot water during spouting of water.

The controller 7 includes the temperature sensors 48 and 49 that are respectively arranged on upstream and downstream of the hot water and cold water mixing unit 80, and in the calibration mode, setting of a predetermined rotational position or a predetermined drive amount is adjusted on the basis of information transmitted from the temperature sensor 48.

By executing control in such a manner, in the faucet device 1, in entering the calibration mode, a predetermined position or a predetermined drive amount is automatically adjusted. Thus, the faucet device 1 is capable of improving usability of a user.

In the calibration mode, the controller 7 acquires a first temperature that is a temperature at a temperature changing point where searching and specifying a temperature lower than the second target temperature as a target temperature, a second temperature that is a temperature at a temperature changing point where searching and specifying the second target temperature as a target temperature, and a third temperature that is a temperature at a temperature changing point where searching and specifying a temperature higher than the second target temperature as a target temperature, so as to adjust setting of a predetermined rotational position or a predetermined drive amount on the basis of the second and first temperatures and the second and third temperatures.

By executing control in such a manner, it is true that there presents a case where characteristics of the thermo-sensitive spring 83 change between under and over the second target temperature (for example, 40° C.), the faucet device 1 adjusts setting of a rotational position or a drive amount that are predetermined on the basis of a temperature (namely, temperature on straight line AB) within a range lower than the second target temperature and a temperature (namely, temperature on straight line BC) within a range higher than the second target temperature, so that it is possible to prevent a set temperature from shifting in executing temperature adjustment crossing a predetermined temperature.

Note that the actuator is the motor 62, in the calibration mode, the temperature sensor 49 arranged on downstream of the hot water and cold water mixing unit 80 detects a spouted water temperature, and the controller 7 adjusts setting of a predetermined rotational position or a predetermined drive amount on the basis of a drive amount (namely, the number of steps) of the motor 62 and a spouted water temperature when the motor 62 takes the above-mentioned drive amount (namely, the number of steps).

By executing control in such a manner, the faucet device 1 executes simple operational processing on the basis of a drive amount (namely, the number of steps) of the motor 62 and a spouted water temperature, so that it is possible to simplify software processing.

During the calibration mode, the controller 7 does not release the excitation of the motor 62. In other words, the controller 7 keeps an energized state of the motor 62 during the calibration mode.

By executing control in such a manner, in a case where the excitation is released after driving the motor 62 by a small step, there presents possibility in the faucet device 1 that spring back occurs, which causes the motor 62 to return to the last position due to load that is applied to the motor 62; however, it is possible to remove effects due to the above-mentioned spring back, and further to execute precise temperature controlling during execution of calibration. Thus, the faucet device 1 is capable of improving the accuracy in calibration.

The number of temperature changing points in the above-mentioned calibration mode is three; however, may be two or one.

Specifically, in the calibration mode, the controller 7 may search two temperature changing points, and further may adjust setting of a predetermined rotational position or a predetermined drive amount on the basis of the specified temperature changing points. For example, the two temperature changing points may be temperatures near the second target temperature (for example, 40° C.). Similar to the calibration in a case where the number of temperature changing points is three, the controller 7 calculates an assignment factor of two temperature changing points so as to calculate a rotational position of the motor 62 for each set temperature.

By executing control in such a manner, the faucet device 1 is capable of executing calibration without taking time, while keeping the accuracy in calibration near the second target temperature.

Alternatively, in the calibration mode, the controller 7 may search a single temperature changing point, and further may adjust setting of a predetermined rotational position or a predetermined drive amount on the basis of the specified temperature changing point. For example, the single temperature changing point may be a temperature whose target temperature is the second target temperature (for example, 40° C.). The controller 7 calculates a rotational position of the motor 62 for each set temperature, on the basis of a single temperature changing point and a preliminarily-set assignment factor.

By executing control in such a manner, the faucet device 1 is capable of shortening a time interval until completion of calibration.

According to one aspect of the embodiments, it is possible to shorten a time interval until a spouted water temperature stabilizes, and further to improve the accuracy in temperature adjustment.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

SUPPLEMENTARY NOTE (1)

A faucet device including:

- a water spout part that spouts water towards an interior of a bathroom;
- a hot water and cold water mixing unit that mixes warm water and cold water to be supplied to the water spout part;
- an actuator that causes the hot water and cold water mixing unit to operate;
- a controller configured to control driving of the actuator; and
- an operation unit configured to transmit information on a set temperature to the controller based on an operation of a user, wherein
- the hot water and cold water mixing unit includes:
  - a body casing in which a hot water inlet, a cold water inlet, and a mixed hot water and cold water outlet are formed;
  - a thermo-sensitive energizing part that changes in accordance with a temperature of mixed hot water to be capable of adjusting open degrees of the hot water inlet and the cold water inlet; and
  - a valve body that is incorporated into the body casing to be able to slide along an axial direction of the body casing to adjust the open degrees of the hot water inlet and the cold water inlet, and the controller is further configured to:

execute a water spouting mode and a calibration mode, the water spouting mode being a mode for driving, in receiving the information on the set temperature, the actuator to a predetermined position or by a predetermined drive amount that are corresponding to the set temperature to adjust a position of the valve body in an axial direction of the valve body; and the calibration mode is a mode for adjusting setting of the predetermined position or the predetermined drive amount in accordance with at least one of an arrangement environment and product unevenness.

(2)

The faucet device according to (1) further including:

a temperature sensor arranged on upstream or downstream of the hot water and cold water mixing unit, wherein in the calibration mode, setting of the predetermined position or the predetermined drive amount is adjusted based on information from the temperature sensor.

(3)

The faucet device according to (1) or (2), wherein in the calibration mode, the controller is further configured to:

cause the actuator to operate while spouting water from the water spout part.

(4)

The faucet device according to any one of (1) to (3), wherein the calibration mode can be executed by an operation with respect to the operation unit.

(5)

The faucet device according to any one of (1) to (4), wherein the controller is further configured to:

in the calibration mode;

search equal to or more than three temperature changing points; and adjust the predetermined position or the predetermined drive amount based on the specified temperature changing points.

(6)

The faucet device according to (5), wherein the controller is further configured to:

in the calibration mode;

acquire a first temperature that is a temperature at a temperature changing point where searching and specifying a temperature lower than a predetermined temperature as a target temperature; a second temperature that is a temperature at a temperature changing point where searching and specifying the predetermined temperature as a target temperature; and a third temperature that is a temperature at a temperature changing point where searching and specifying a temperature higher than the predetermined temperature as a target temperature; and adjust setting of the predetermined position or the predetermined drive amount based on the second and the first temperatures, and the second and the third temperatures.

(7)

The faucet device according to according to any one of (1) to (4), wherein the controller is further configured to:

in the calibration mode;

search two temperature changing points; and adjust setting of the predetermined position or the predetermined drive amount based on the specified temperature changing points.

(8)

The faucet device according to any one of (1) to (4), wherein the controller is further configured to:

in the calibration mode;

search a single temperature changing point; and adjust setting of the predetermined position or the predetermined drive amount based on the specified temperature changing point.

(9)

The faucet device according to any one of (1) to (8), wherein the actuator includes a motor, and in the calibration mode;

a temperature sensor arranged on downstream of the hot water and cold water mixing unit detects a spouted water temperature, and the controller is further configured to:

adjust setting of the predetermined position or the predetermined drive amount based on a drive amount of the motor and the spouted water temperature in a case where the motor takes the drive amount.

(10)

The faucet device according to any one of (1) to (3), wherein in the calibration mode;

a temperature sensor arranged on upstream of the hot water and cold water mixing unit detects a hot water supplying temperature, and the controller is further configured to:

determine whether or not the hot water supplying temperature is equal to or less than a predetermined temperature.

(11)

The faucet device according to (10), wherein the controller is further configured to:

in the calibration mode;

in a case where the hot water supplying temperature is equal to or less than the predetermined temperature, execute the water spouting mode by using a table that stores therein the set temperature, and the predetermined position or the predetermined drive amount in association with each other.

(12)

The faucet device according to any one of (1) to (11), wherein the actuator includes a motor, and the controller is further configured to:

during the calibration mode, not release excitation of the motor.

(13)

The faucet device according to any one of (1) to (12), wherein in the calibration mode;

a temperature sensor that is arranged on upstream of the hot water and cold water mixing unit detects a hot water supplying temperature, and the controller is further configured to:

start to adjust setting of the predetermined position or the predetermined drive amount after the hot water supplying temperature becomes stable.

What is claimed is:

1. A faucet device comprising:

a water spout part that spouts water towards an interior of a bathroom;

a hot water and cold water mixing unit that mixes hot water and cold water to be supplied to the water spout part;

an actuator that causes the hot water and cold water mixing unit to operate;

a controller configured to control driving of the actuator; and an operation unit configured to transmit information on a set temperature to the controller based on an operation of a user, wherein the hot water and cold water mixing unit includes:

a body casing in which a hot water inlet, a cold water inlet, and a mixed hot water and cold water outlet are formed;

a thermo-sensitive energizing part that changes in accordance with a temperature of mixed hot water to be capable of adjusting open degrees of the hot water inlet and the cold water inlet; and a valve body that is incorporated into the body casing to be able to slide along an axial direction of the body casing to adjust the open degrees of the hot water inlet and the cold water inlet, and the controller is further configured to:

execute a water spouting mode and a calibration mode, the water spouting mode being a mode for driving, in receiving the information on the set temperature, the actuator to a predetermined position or by a predetermined drive amount that are corresponding to the set temperature to adjust a position of the valve body in an axial direction of the valve body; and the calibration mode is a mode for adjusting setting of the predetermined position or the predetermined drive amount in accordance with at least one of an arrangement environment and product unevenness.

2. The faucet device according to claim 1 further comprising:

a temperature sensor arranged on upstream or downstream of the hot water and cold water mixing unit, wherein in the calibration mode, setting of the predetermined position or the predetermined drive amount is adjusted based on information transmitted from the temperature sensor.

3. The faucet device according to claim 1, wherein the calibration mode can be executed by an operation with respect to the operation unit.

4. The faucet device according to claim 2, wherein in the calibration mode, the controller is further configured to:

cause the actuator to operate while spouting water from the water spout part.

5. The faucet device according to claim 4, wherein the controller is further configured to:

in the calibration mode;

search equal to or more than three temperature changing points; and adjust the predetermined position or the predetermined drive amount based on the specified temperature changing points.

6. The faucet device according to claim 5, wherein the controller is further configured to:

in the calibration mode;

acquire a first temperature that is a temperature at a temperature changing point where searching and specifying a temperature lower than a predetermined temperature as a target temperature; a second temperature that is a temperature at a temperature changing point where searching and specifying the predetermined temperature as a target temperature; and a third temperature that is a temperature at a temperature changing point where searching and specifying a temperature higher than the predetermined temperature as a target temperature; and adjust setting of the predetermined position or the predetermined drive amount based on the second and the first temperatures, and the second and the third temperatures.

7. The faucet device according to claim 4, wherein the controller is further configured to:

in the calibration mode;

search two temperature changing points; and adjust setting of the predetermined position or the predetermined drive amount based on the specified temperature changing points.

8. The faucet device according to claim 4, wherein the controller is further configured to:

in the calibration mode;

search a single temperature changing point; and adjust setting of the predetermined position or the predetermined drive amount based on the specified temperature changing point.

9. The faucet device according to claim 4, wherein the actuator includes a motor, and in the calibration mode;

a temperature sensor arranged on downstream of the hot water and cold water mixing unit detects a spouted water temperature, and the controller is further configured to:

adjust setting of the predetermined position or the predetermined drive amount based on a drive amount of the motor and the spouted water temperature in a case where the motor takes the drive amount.

10. The faucet device according to claim 4, wherein in the calibration mode;

a temperature sensor arranged on upstream of the hot water and cold water mixing unit detects a hot water supplying temperature, and the controller is further configured to:

determine whether or not the hot water supplying temperature is equal to or less than a predetermined temperature.

11. The faucet device according to claim 4, wherein the actuator includes a motor, and the controller is further configured to:

during the calibration mode, not release excitation of the motor.

12. The faucet device according to claim 4, wherein in the calibration mode;

a temperature sensor that is arranged on upstream of the hot water and cold water mixing unit detects a hot water supplying temperature, and the controller is further configured to:

start to adjust setting of the predetermined position or the predetermined drive amount after the hot water supplying temperature becomes stable.

* * * * *